United States Patent [19]
Van Deventer

[11] Patent Number: 5,396,358
[45] Date of Patent: Mar. 7, 1995

[54] OPTICAL REFLECTIVE STAR DEVICE

[75] Inventor: Mattijs O. Van Deventer, Leidschendam, Netherlands

[73] Assignee: Koninklijke PTT Nederland B.V., Groningen, Netherlands

[21] Appl. No.: 264,849

[22] Filed: Jun. 23, 1994

Related U.S. Application Data

[63] Continuation of Ser. No. 938,697, Sep. 1, 1992, abandoned.

[30] Foreign Application Priority Data

Sep. 3, 1991 [NL] Netherlands .......................... 9101490

[51] Int. Cl.⁶ ............................................. H04B 10/20
[52] U.S. Cl. ........................................ 359/120; 359/178
[58] Field of Search ............... 359/120, 121, 152, 169, 359/174, 178, 179; 370/94.3

[56] References Cited

U.S. PATENT DOCUMENTS

| | | | |
|---|---|---|---|
| 4,257,124 | 3/1981 | Porter et al. | 359/178 |
| 4,712,859 | 12/1987 | Albanese et al. | 359/120 |
| 4,941,738 | 7/1990 | Olsson | 359/347 |
| 4,972,513 | 11/1990 | Mochizuki et al. | 359/179 |

FOREIGN PATENT DOCUMENTS

| | | | |
|---|---|---|---|
| 30315351 | 5/1989 | European Pat. Off. | |
| 2120830 | 5/1990 | Japan . | |
| 2306677 | 12/1990 | Japan . | |
| 3027027 | 2/1991 | Japan . | |
| WO91/03753 | 3/1991 | WIPO . | |

OTHER PUBLICATIONS

"Low-Noise Erbium-Doped Fibre Amplifier Operating at 1.54 μm" published Electronics Letters, Sep. 10, 1987, vol. 23, No. 19, pp. 1026-1028.

A. A. M. Saleh, et al, "Reflective Single-Mode Fiber-Optic Passive Star Couplers", Mar. 1988, pp. 392-398, Journal of Lightwave Technology, vol. 6, No. 3.

N. A. Olsson, "Polarisation-Independent Configuration Optical Amplifier", Electronics Letters, Jul. 1988, vol. 24, No. 17, pp. 1075-1076.

*Primary Examiner*—Benedict V. Safourek
*Attorney, Agent, or Firm*—Frishauf, Holtz, Goodman & Woodward

[57] ABSTRACT

Optical reflective star device for transmitting signals between a plurality of transceivers, provided with a plurality of ports for distributing each signal supplied to one port over the other ports. The reflective star device is made up of a plurality of star elements having a plurality of reflection branches and a plurality of through-connections between the star elements. An optical amplifier is disposed in at least one of the reflection branches and/or through-connections.

6 Claims, 1 Drawing Sheet

OPTICAL REFLECTIVE STAR DEVICE

This application is a continuation, of application Ser. No. 07/938,697, filed Sep. 1, 1992, now abandoned.

BACKGROUND OF THE INVENTION

The invention relates to an optical reflective star device for transmitting signals between a plurality of transceivers, provided with a plurality of ports for distributing each signal supplied to one port over the other ports, comprising a plurality of star elements with a plurality of reflection branches and a plurality of through-connections between the star elements. Such a device is known from the article entitled "Reflective Single-Mode Fibre-Optic Passive Star Couplers", published in Journal of Lightwave Technology, Vol. 6, No. 3 Mar. 1988, pages 392–398.

In said article the structure of various star configurations is described, as is the advantage of lower losses in the star configuration than in the bus configuration. The use of the star configuration in LAN networks is therefore becoming increasingly more frequent.

Moreover, in said article preference is given to reflective star devices compared to transmissive star devices, since in the case of the former devices the number of glass fibres and consequently the number of the associated components is lower by a factor of 2 compared to the transmissive star device. Instead of separate inputs and outputs for the transmitter and receiver device, the reflective star device has ports each serving for both inputting signals and outputting them from the reflective star device from a transmitter and receiver device. The various connections could then be provided with diplexers for the separation of transmitted and received signals.

The known reflective star device is composed of a number of star elements, for example 3-dB coupling devices, transmissive star elements or reflective star elements which distribute a signal supplied to the port of such a star element over its other ports. Reflectors are connected to a number of ports of the elements to create reflective sites, while the remaining ports of a star element are connected to ports of another element by means of through-connections.

A reflective star device can be used in a network for transmitting optical signals between a number of transceivers. Because of losses in the network, for example due to attenuation, splitting or a combination of signals, it is often desirable to make use of amplification of the signals which are transmitted between the transceivers.

Optical amplifiers have limited output power. Connecting an amplifier directly downstream of a transmitter, where the power is, after all, already high, does not therefore always make sense. In addition safety problems are associated with very high power.

Optical amplifiers introduce additional noise. Connecting an amplifier upstream of e receiver does not therefore always make sense since the useful signal is difficult to distinguish from the noise.

The object of the invention is to provide a reflective device of the type mentioned above, in which the problems mentioned above are overcome.

This object is achieved according to the invention in that an optical amplifier is disposed in at least one of the reflection branches and/or through-connections.

A reflective star device, from an optical point of view, is perfectly symmetrical and is therefore nearly always arranged centrally in an optical network. Thus, the reflective star device will always be in the centre of the transmission section between the sender and the transmitter of the transceivers, as a result of which amplification will always take place in the centre of the transmission section. In this way sufficient signal strength can be achieved for noise to be no longer significant. However, the signal is not so strong as to be able to cause the optical amplifier to be overdriven.

Furthermore, the invention has the advantage that, as a result of using amplification in the reflective star device itself, considerably fewer amplifiers are required, which is of increasing importance in particular for fairly large networks.

Apart from that, in the case of optical amplifiers, half the amplification factor in one direction is sufficient in the reflection branches, since the optical signal passes through the amplifier twice when reflected.

It is observed that from "Patent Abstracts of Japan", vol. 14, no 343 (P-1082) Jul. 25, 1990 & JP, A2 120 830 (NEC), May 8, 1990 a distribution network having a number of reflection branches with reflective amplifiers is known per se. Said known network differs from a reflective star. Moreover, the amplifiers in the known network cannot operate concurrently. One is in operation and if this one fails, another amplifier is switched on. Furthermore, a through connection provided with an amplifier is not known from said "Patent Abstracts of Japan" publication.

In one embodiment of the invention, the optical amplifier disposed in a through-connection is a bidirectionally pumped optical glass-fibre amplifier, for example an erbium-doped optical fibre amplifier.

In another embodiment of the invention, the amplifier disposed in the reflection branch is an optical semiconductor amplifier, preferably combined with a polarisation-independent reflector.

BRIEF DESCRIPTION OF THE DRAWINGS

The invention will be explained in more detail below on the basis of the drawings. In the drawings.

DETAILED DESCRIPTION

Figure 1:
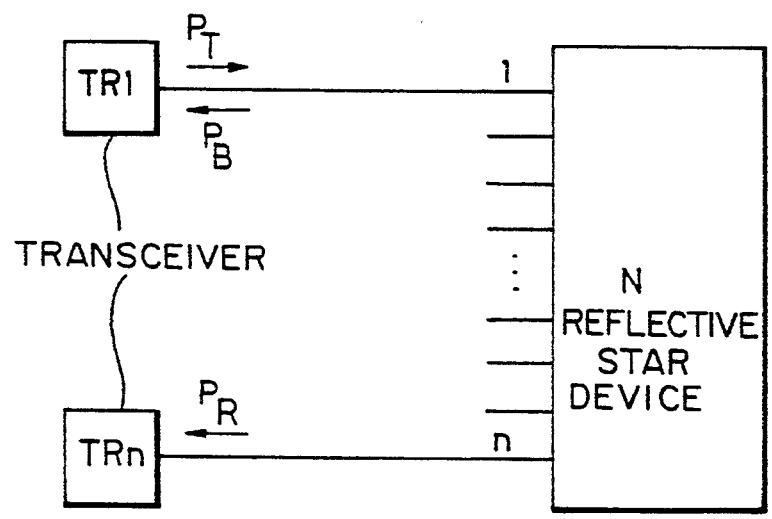
FIG. 1 shows a block diagram of a conventional network composed of one or more reflective star devices.

FIG. 1 shows a conventional reflective star device N with associated ports 1–n. A transceiver device TR1 is connected to port 1. The transmitter of transceiver device $TR_1$ sends an optical signal having a power $P_T$, which signal is distributed over the other ports by the reflective star device N, so that a power $P_R$ is received in the transceiver TRn. This network has the property that a reflection signal of power $P_B$ is also emitted in the direction of the transceiver TR1.

Figure 2:
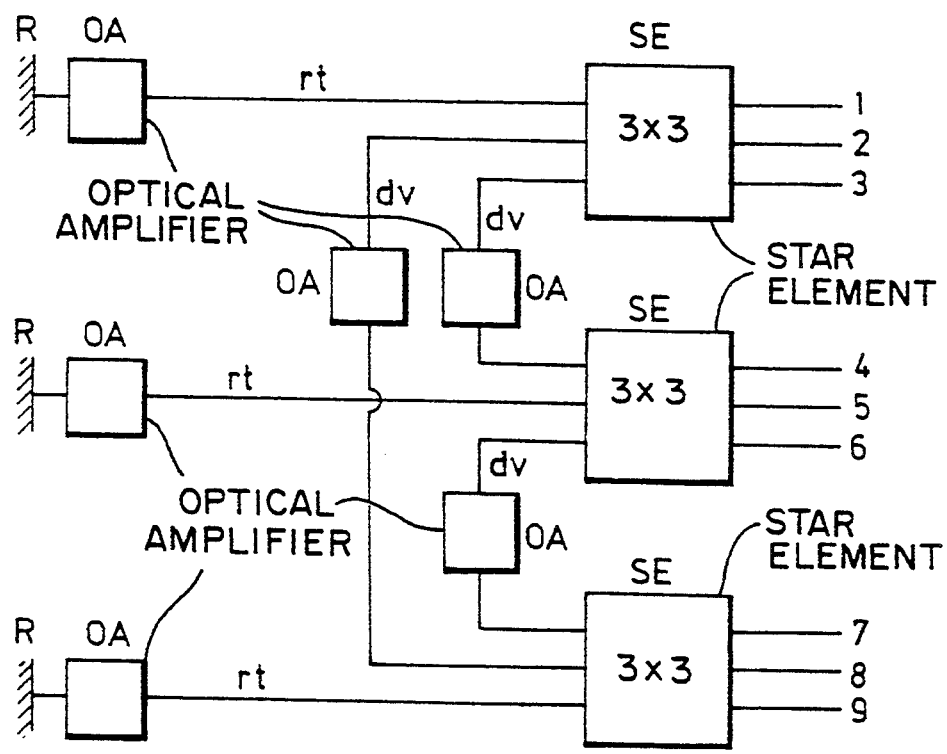
FIG. 2 shows an embodiment of the reflective star device according to the invention.

FIG. 2 shows a reflective star device of limited extent according to the invention.

This reflective star device of FIG. 2 comprises three star elements SE in the form of transmissive star devices of three-times-three ports, which reflective star device has nine input/output ports 1–9, which are formed by the right-hand ports of the three-times-three star elements SE. In each case, a reflection branch rt having a schematically shown reflector R is connected to one of the left-hand ports of the three-times-three star elements SE. The remaining left-hand ports of said three-timesthree star elements SE are connected to the left-hand ports of the other three-times-three star elements SE. The remaining left-hand ports of said three-times-three star elements SE are connected to the left-hand ports of the other three-times-three star elements SE. A three-times-three star element is described at page 397, right-hand column, lines 4–8, of the above identified article entitled "Reflective Single-Mode Fibre-Optic Passive Star Coupler".

In the case of the embodiment of the invention shown in FIG. 2, amplifiers OA are disposed in the reflection branches rt and in the through-connections dv. It is clear that amplifiers are used only in the reflection branches and through-connections in which this is desirable on the basis of the level of the optical signal. For reasons of standardization, it is, however, preferable to place optical amplifiers in all reflection branches and through-connections.

It can be seen from FIG. 1 that a reflective star device, from an optical point of view, is perfectly symmetrical and is therefore almost always placed centrally in an optical network. Because the amplifiers are fitted within the reflective star device itself, the optimum case is achieved in which the optical amplification takes place virtually in the centre of each transmission section. In this way, the optical signal is in general strong enough and the noise is hardly significant. The signal in the said centre of the transmission section is however not so strong as to cause the amplifier to be overdriven.

In a network for transmitting optical signals from and to N transceivers, as a consequence of losses due to, For example, attenuation, splitting and combination of signals, usually N optical amplifiers OA will be required for the transceivers. These optical amplifiers OA can also be connected to the ports of the reflective star device.

If, according to the invention, the optical amplifiers OA were to be fitted in all reflection branches rt and through-connections dv, only $\sqrt{N}$ optical amplifiers OA would be required in the reflection branches rt and $\frac{1}{2}(N-\sqrt{N})$ optical amplifiers OA would be required in the through connections dv. Thus a maximum of $\frac{1}{2}(N+\sqrt{N})$ of optical amplifiers OA is required. The saving in the number of amplifiers increases as the size of the reflective star device increases and said device has an increasing number of ports.

Apart from that, in the case of the optical amplifiers disposed in the reflection branches, it is sufficient to use amplifiers which have in one direction half the amplification factor, expressed in dB, that would be required for the total desired amplification. This is because the optical signal in the reflection branches passes through the amplifier twice.

Preferably, an optical bidirectionally pumped optical glass-fibre amplifier, for example an erbium-doped glass-fibre amplifier is used in the through-connections. This type of amplifier has low reflection, good noise properties and is polarization-independent. Such an amplifier is known per se from the article entitled "Low-Noise Erbium-Doped Fibre Amplifier Operating at 1.54 $\mu$m" published in "Electronics Letters", Sep. 10, 1987, Vol. 23, No. 19, pages 1026–1028.

The amplifiers OA in the reflection branches are preferably optical semiconductor amplifiers, optionally with the reflector in a polarization-independent configuration. This configuration is compact and cheaper. Such an amplifier is described in "Polarisation-independent configuration optical amplifier" by N. A. Olsson, published in Electronic Letters, 1988, Vol. 24, No. 17, pages 1075–1076 and further in U.S. Pat. No. 4,941,738.

One or more reflective star devices according to the invention can be disposed in an optical transmission network, providing a number of ports For the connection of transceiver devices.

I claim:

1. An optical transmission system for transmitting signals between a plurality of transceivers, comprising:
    a distribution device having a plurality of ports for distributing each of said signals supplied to any of said ports over any of the other of said ports;
    said distribution device including a reflective star device comprising a plurality of star elements (SE), each star element having a reflection branch (rt) coupled to a reflector (R), and a plurality of input/output ports;
    a plurality of through-connections (dv) interconnecting said star elements (SE) such that each star element (SE) is connected to each of the other star elements (SE) via a through-connection; and
    an optical amplifier (OA) interconnected in each of said reflection branches (rt) and in each of said through-connections (dv) of said star elements of said reflective star device.

2. The optical transmission system according to claim 1, wherein the optical amplifiers interconnected in each of said through-connections each comprise a bidirectionally pumped optical glass-fibre amplifier.

3. The optical transmission system according to claim 2, wherein the bidirectionally pumped optical glass-fibre amplifiers interconnected in each of said through-connections each comprise an erbium-doped optical fibre amplifier.

4. The optical transmission system according to claim 3, wherein the optical amplifiers interconnected in each of said reflection branches comprise an optical semiconductor amplifier.

5. The optical transmission system according to claim 2, wherein the optical amplifiers interconnected in each of said reflection branches comprise an optical semiconductor amplifier.

6. The optical transmission system according to claim 1, wherein the optical amplifiers interconnected in each of said reflection branches comprise an optical semiconductor amplifier.

* * * * *